United States Patent
Grucci et al.

(10) Patent No.: US 10,074,107 B2
(45) Date of Patent: Sep. 11, 2018

(54) METHODS AND APPARATUS FOR TARGETING CUSTOMERS

(75) Inventors: Kyle T. Grucci, Southwick, MA (US);
Ryan S. O'Connell, Chester, NH (US);
Kevin Osborn, Newton, MA (US)

(73) Assignee: Oracle America, Inc., Redwood Shores, CA (US)

( * ) Notice: Subject to any disclaimer, the term of this patent is extended or adjusted under 35 U.S.C. 154(b) by 2494 days.

(21) Appl. No.: 11/331,930

(22) Filed: Jan. 13, 2006

(65) Prior Publication Data

US 2017/0200198 A1    Jul. 13, 2017

(51) Int. Cl.
*G06Q 30/02* (2012.01)
*H04W 4/02* (2018.01)

(52) U.S. Cl.
CPC .......... *G06Q 30/0267* (2013.01); *H04W 4/02* (2013.01)

(58) Field of Classification Search
CPC ............................. G06Q 30/00; G06Q 30/02
USPC ...... 705/14, 14.58, 14.12, 14.39; 340/425.5; 455/414.1; 382/100; 707/706
See application file for complete search history.

(56) References Cited

U.S. PATENT DOCUMENTS

| | | | |
|---|---|---|---|
| 6,317,718 B1* | 11/2001 | Fano | G06F 17/3087 705/14.39 |
| 6,545,596 B1* | 4/2003 | Moon | 340/425.5 |
| 6,647,257 B2* | 11/2003 | Owensby | 455/414.1 |
| 7,562,028 B1 | 7/2009 | Donner | |
| 7,565,328 B1 | 7/2009 | Donner | |
| 7,904,334 B2 | 3/2011 | Chen et al. | |
| 8,014,762 B2* | 9/2011 | Chmaytelli et al. | 455/414.1 |
| 8,620,741 B2 | 12/2013 | Chen et al. | |
| 8,688,671 B2* | 4/2014 | Ramer | G06Q 30/02 707/706 |
| 9,123,060 B2 | 9/2015 | Link, II et al. | |
| 2001/0039514 A1* | 11/2001 | Barenbaum et al. | 705/14 |
| 2002/0065713 A1* | 5/2002 | Awada et al. | 705/14 |
| 2002/0077910 A1* | 6/2002 | Shioda et al. | 705/14 |
| 2003/0103644 A1* | 6/2003 | Klayh | 382/100 |
| 2006/0155597 A1* | 7/2006 | Gleason | G06Q 30/02 705/14.12 |

* cited by examiner

*Primary Examiner* — Marilyn G Macasiano
(74) *Attorney, Agent, or Firm* — Kilpatrick Townsend & Stockton LLP

(57) ABSTRACT

A system receives notification that at least one user interested in acquiring desired information is within a predefined area. The system receives the desired information from a client located within the predefined area, and electronically transmits the desired information to the at least one user. The desired information is received by the at least one user via a wireless device.

12 Claims, 4 Drawing Sheets

METHODS AND APPARATUS FOR TARGETING CUSTOMERS

BACKGROUND

Conventional methods for targeting customers with advertising information often focus on locating customers who may be interested in receiving advertisements related to products offered by merchants. Conventional technologies for advertising to customers can include posting a billboard in a location near a merchant such that potential customers, traveling near the location of the merchant, will view the billboard, and be drawn to visit the merchant's location. This method of attracting customers has an advantage in that, if the customers are interested in the merchant's products, the customer is physically near the merchant's location such that the customer can easily visit the merchant's location. The advertising displayed on the billboard can be changed by removing the current advertising on the billboard, and replacing it with new advertising.

Conventional technologies for advertising to customers can also include sending advertisements directly to the customer via electronic methods such as emailing advertisements to the customer, or text messaging the customer's cell phone. Conventional technologies allow for compiling email lists (or lists of cell phone numbers), and broadcasting advertisements to the email list (or list of cell phone numbers). Using this technology, one email (or text message) is broadcast to multiple recipients. This method of attracting customers has an advantage in that many potential customers can be notified of a merchant's products via one broadcast of an advertisement message to the (potential) customers' cell phone and/or email, resulting in a very efficient method of advertising to potential customers.

SUMMARY

Conventional technologies for targeting users with advertisements suffer from a variety of deficiencies. In particular, conventional technologies that target users (i.e., potential customers or existing customers) are limited in that conventional technologies do not target users real time, based on the location of the user. Conventional technologies for targeting users via the use of billboards are limited in that billboards are static, and cannot be easily changed or customized (i.e., displaying different advertisements on the billboard) depending on the user viewing the billboard. A merchant may want to give different incentives to a first user (i.e., a potentially new customer) versus second user (i.e., an existing customer). For example, a merchant may give a first user (i.e., a new customer) a discount to try the merchant's product while giving a second user (i.e., an existing customer) a discount on multiple purchases.

Conventional technologies for transmitting advertisements to users (i.e., potential customers or existing customers) via an email or text-messaging broadcast are limited in that a merchant transmitting advertisements to users who are not physically located in a proximity to the merchant's location (such that the user could utilize the transmitted advertisement) is sometimes ineffective. Additionally, conventional technologies for transmitting advertisements to users (i.e., potential customers or existing customers) via an email or text-messaging broadcast are limited in that transmitting unwanted advertising is considered to be Spam.

Embodiments disclosed herein significantly overcome such deficiencies and provide a user targeting process that receives notification when a user (i.e., a customer) who is interested in acquiring desired information (i.e., information regarding purchasing a service or item), is physically located near a client (i.e., a merchant). The user has previously registered to receive the desired information. During the registration, the user can specify a wireless device (i.e., cell phone, blackberry, etc) on which the user wishes to receive the desired information, as well as time periods during which the user either wishes to receive the desired information, or does not wish to receive the desired information. The user can also specify the desired information in which the user is interested in receiving. For example, the user may wish to receive desired information regarding available tickets to a sporting event, or an ongoing sale at a favorite merchant's location. The user targeting process receives the desired information (i.e., available tickets to a sporting event, or an ongoing sale at a favorite merchant's location, etc) from a client (i.e., a merchant, etc), and electronically transmits the desired information to users who have registered to receive the desired information, and are physically located in the vicinity of the merchant. Global Positioning Satellite (GPS) technology allows the user targeting process to be notified when the user is in the proximity of a client (i.e., a merchant). The user targeting process can also notify clients when the marketing climate is optimal, to suggest that the clients transmit desired information to user (via the user targeting process). For example, the user targeting process may determine that there are many users in the area who may be interested in purchasing from a client, and notify the client that there is a plurality of users in the area who have registered to receive the desired information from the client. Additionally, the user targeting process may determine that the desired information traffic is low, and again, notify the client that desired information transmitted to users at that time would result in a captive audience.

Embodiments disclosed herein provide a system that includes a computer system executing a user targeting process that receives notification that at least one user, interested in acquiring desired information, is within a predefined area. The user targeting process receives the desired information from a client located within the predefined area, and electronically transmits the desired information to the at least one user. The desired information is received by the at least one user via a wireless device.

During an example operation of one embodiment, suppose a user, such as a golfer, is driving along a highway near a golfing store. Previously, the user has registered to receive desired information (specifically related to golfing and any other sporting activity) from the user targeting process, and has specified to receive the desired information via text messages on the user's cell phone, that the user has in his coat pocket. The user targeting process receives notification that the user is in the vicinity, via Global Positioning Satellite technology. The user targeting process determines that this user wishes to receive desired information relating to any type of sporting activity, and correlates this information with client information (i.e., the merchants who have registered to utilize the user targeting process, the types of desired information those merchants transmit, etc). The user targeting process determines that a client, such as a golfing store, has desired information, such as an ongoing sale on golf clubs, that the user (i.e., the golfer) would be interested in receiving. The user targeting process electronically transmits a text message to the user's cell phone, notifying the user of the sale on golf clubs at the golfing store. The user receives the text message, exits the highway at the next exit, and arrives at the client (i.e., the golfing store) to take advantage of the sale on golf clubs. During the text messaging of the golf club sale to the user, the user targeting process also transmitted a special 'coupon code' that the user (i.e., the golfer) gives to the client (i.e., the golfing store) to receive an additional discount off the already discounted golf clubs. When the user (i.e., the golfer) utilizes the coupon code, the client (i.e., the golfing store) has a method of determining the extent to which the user targeting process was effective in increasing sales for the client (i.e., the golfing store).

Other embodiments of the disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. Embodiments disclosed herein, may be employed in data communications devices and other computerized devices and software systems for such devices such as those manufactured by Sun Microsystems, Inc. of Santa Clara, California.

BRIEF DESCRIPTION OF THE DRAWINGS

The foregoing disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein provide a user targeting process that receives notification when a user (i.e., a customer) who is interested in acquiring desired information (i.e., information regarding purchasing a service or item), is physically located near a client (i.e., a merchant). The user has previously registered to receive the desired information. During the registration, the user can specify which wireless device (i.e., cell phone, blackberry, etc) on which the user wishes to receive the desired information, as well as time periods during which the user either wishes to receive the desired information, or does not wish to receive the desired information. The user can also specify what desired information in which the user is interested. For example, the user may wish to receive desired information regarding available tickets to a sporting event, or an ongoing sale at a favorite merchant's location. The user targeting process receives the desired information (i.e., available tickets to a sporting event, or an ongoing sale at a favorite merchant's location, etc) from a client (i.e., a merchant, etc), and electronically transmits the desired information to users who have registered to receive the desired information, and are physically located in the vicinity of the merchant. The user targeting process can also notify clients when the marketing climate is optimal, to suggest that the clients transmit desired information to user (via the user targeting process). For example, the user targeting process may determine that there are many users in the area who may be interested in purchasing from a client, and notify the client that there is a plurality of users in the area who have registered to receive desired information from the client. Additionally, the user targeting process may determine that the desired information traffic is low, and again, notify the client that desired information transmitted to users at that time, would result in a captive audience.

In one embodiment, the user targeting process that receives notification that at least one user, interested in acquiring desired information, is within a predefined area. The user targeting process receives the desired information from a client located within the predefined area, and electronically transmits the desired information to the at least one user. The desired information received by the at least one user via a wireless device.

Figure 1:
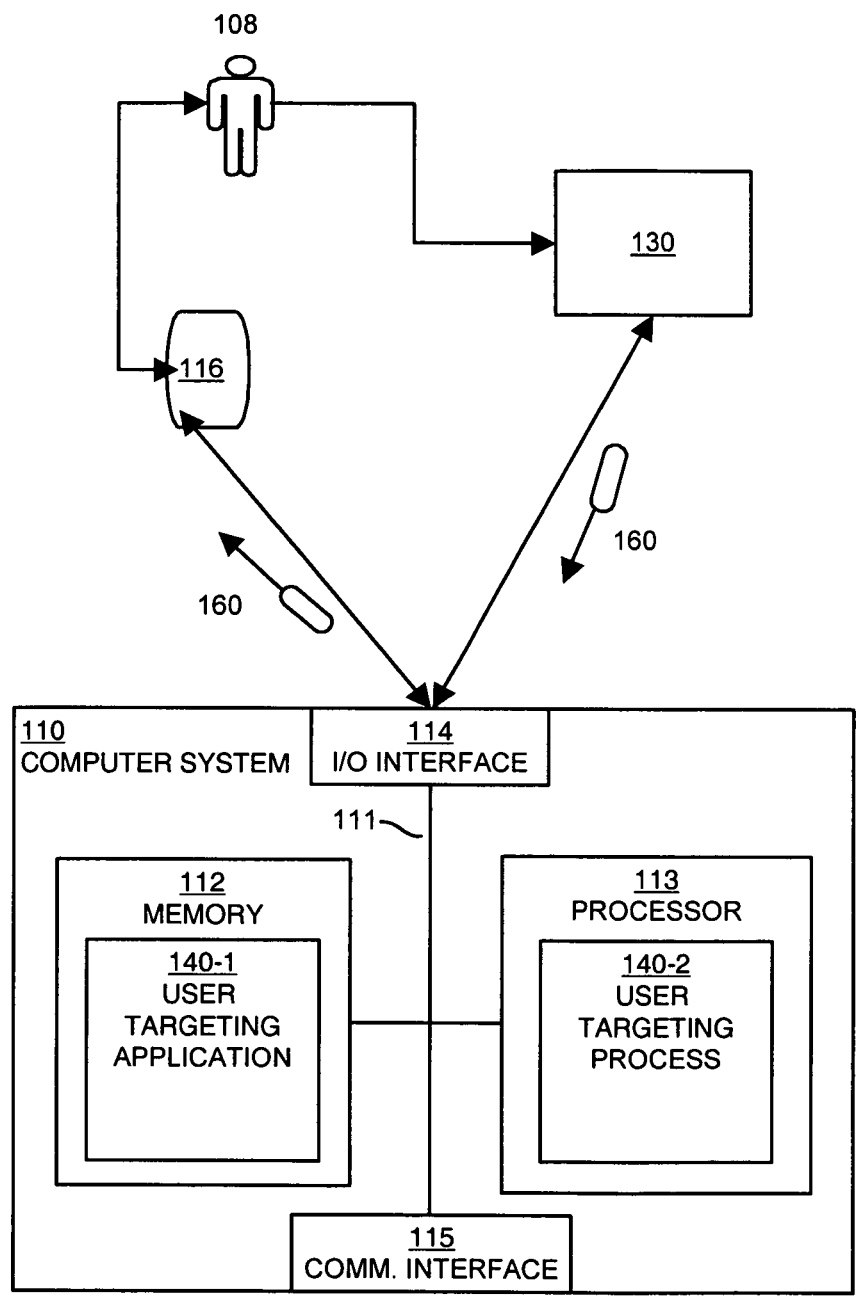
FIG. 1 shows a high-level block diagram of a computer system according to one embodiment disclosed herein.

FIG. 1 is a block diagram illustrating an example architecture of a computer system 110 that executes, runs, interprets, operates or otherwise performs a user targeting application 140-1 and process 140-2 suitable for use in explaining example embodiments disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. A wireless device 116 (e.g., a cell phone, blackberry, etc.) couples to processor 113 through I/O interface 114 and enables a user 108 to provide input commands and receiving information on the wireless device 116. A client 130 (i.e., a merchant located at the merchant's location)

couples to processor 113 through I/O interface 114 and enables the merchant to send and receive desired information 160 from the user targeting process 140-2. The communications interface 115 enables the computer system 110 to communicate with other devices (i.e., other computers) on a network (not shown). This can allow access to the user targeting application by remote computer systems.

The memory system 112 is any type of computer readable medium and in this example is encoded with a user targeting application 140-1 as explained herein. The user targeting application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the user targeting application 140-1. Execution of user targeting application 140-1 in this manner produces processing functionality in a user targeting process 140-2. In other words, the user targeting process 140-2 represents one or more portions or runtime instances of the user targeting application 140-1 (or the entire application 140-1) performing or executing within or upon the processor 113 in the computerized device 110 at runtime. The user targeting process 140-2 operates as explained herein to receive desired information from a client 130, and transmit the desired information 160 to a user 108 via a wireless device 116.

It is noted that example configurations disclosed herein include the user targeting application 140-1. The user targeting application 140-1 may be stored on a computer readable medium (such as a floppy disk), hard disk, electronic, magnetic, and optical or other computer readable medium. The user targeting application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the user targeting application 140-1 in the processor 113 as the user targeting process 140-2. Those skilled in the art will understand that the computer system 110 may include other processes and/or software and hardware components, such as an operating system not shown in this example.

Further details of configurations explained herein will now be provided with respect to a flow chart of processing steps that show the high level operations disclosed herein to perform the user targeting process 140-2.

Figure 2:
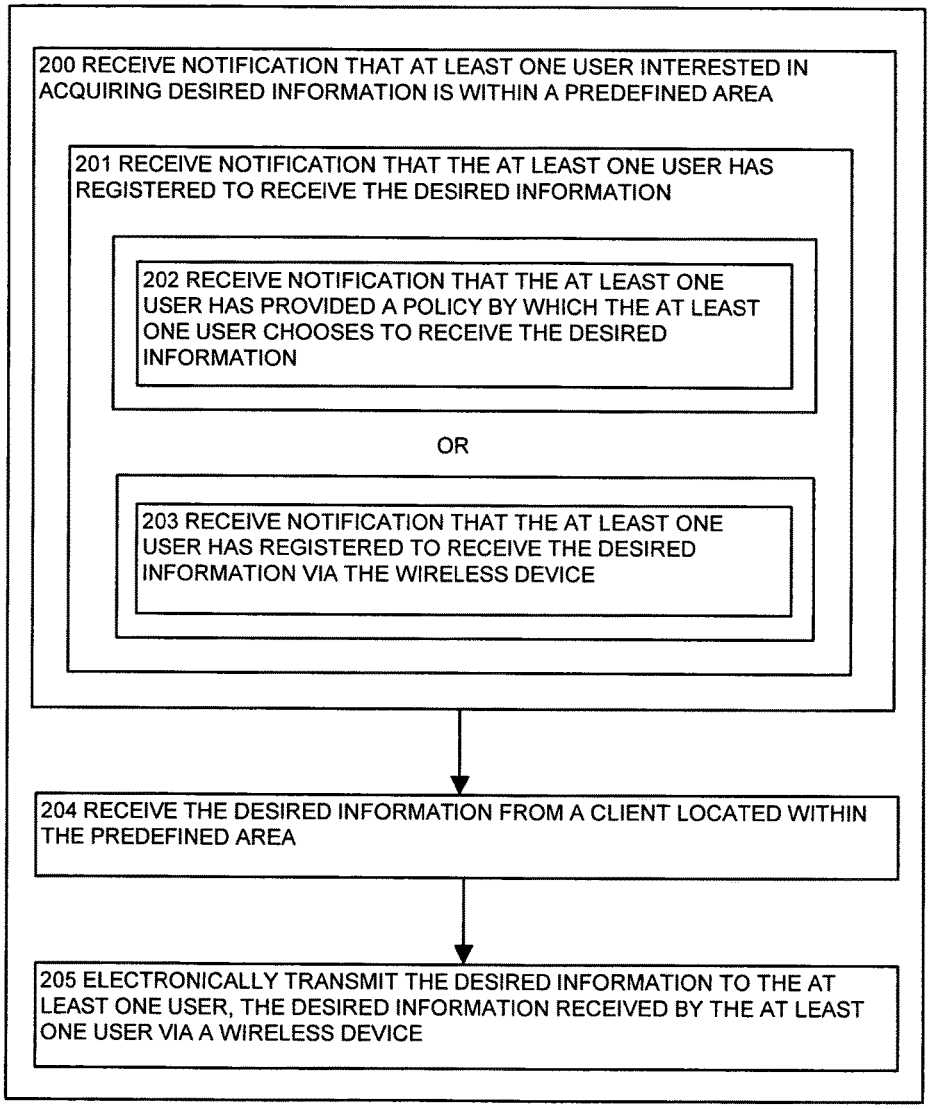
FIG. 2 illustrates a flowchart of an embodiment of a procedure performed by the system of FIG. 1 when the user targeting process receives notification that at least one user, interested in acquiring desired information, is within a predefined area.

FIG. 2 is an embodiment of the steps performed by the user targeting process 140-2 when it receives notification that at least one user 108 interested in acquiring desired information 160 is within a predefined area, and electronically transmits the desired information 160 to the user 108. The user 108 via a wireless device 116 receives the desired information 160.

In step 200, the user targeting process 140-2 receives notification that at least one user 108, interested in acquiring desired information 160 is within a predefined area. In an example configuration, a user 108 is driving on a highway, near a jewelry store. The user targeting process 140-2 receives notification, via Global Positioning Satellite technology, that the user 108 is located in the vicinity of the jewelry store.

In step 201, the user targeting process 140-2 receives notification that the at least one user 108 has registered to receive the desired information 160. The user targeting process 140-2 targets those users 108 who have registered for the service. In other words, rather than pushing unwanted advertisements to unwilling users 108, the user targeting process 140-2 operates such that users 108 decide which advertisements (i.e. desired information 160) those users 108 wish to receive. In this sense, it is the users 108 who pull the advertisements (i.e., the desired information 160) that they wish to receive. In an example configuration, the user 108 driving on a highway, near a jewelry store, has registered to receive desired information 160 regarding the jewelry store, such as upcoming sales, important dates to remember, etc.

In step 202, the user targeting process 140-2 receives notification that the at least one user 108 has provided a policy by which the at least one user 108 chooses to receive the desired information 160. In an example configuration, the user 108 can specify the types of desired information 160 (i.e., those merchants from which the user 108 wishes to receive advertisements), as well as when and where the user 108 wishes to receive that desired information 160. For example, a user 108 may provide a policy to be notified of desired information 160 regarding jewelry stores in the user's 108 neighborhood, during the two week period prior to the user's 108 anniversary. The user 108 may specify in that policy, that the desired information 160 regarding jewelry stores is only wanted during the two week period prior to the user's 108 anniversary, and not during any other time period.

Alternatively, in step 203, the user targeting process 140-2 receives notification that the at least one user 108 has registered to receive the desired information via the wireless device 116. In an example configuration, the user 108 registers one or more wireless devices 116 on which the user 108 wishes to receive the desired information 160. In another example configuration, the user 108 can register to receive a first type of desired information 160 on a first wireless device 116, and a second type of desired information 160 on a second wireless device 116. Thus, the user 108 can specify the type of desired information 160 the user 108 wishes to receive, and on which wireless device 116 the user 108 wishes to receive that desired information 160.

In step 204, the user targeting process 140-2 receives the desired information 160 from a client 130 located within the predefined area. In an example configuration, the client 130 is a jewelry store, holding a sale, and wishes to notify interested customers (i.e., users 108) of the ongoing sale (i.e., the desired information 160). The user targeting process 140-2 receives notification from the jewelry store (i.e., the client 130) of the jewelry store's sale (i.e., the desired information 160).

In step 205, the user targeting process 140-2 electronically transmits the desired information 160 to the at least one user 108. The desired information 160 is received by the at least one user 108 via a wireless device 116. In an example configuration, the user targeting process 140-2 receives notification from a jewelry store (i.e., the client 130) that the jewelry store is having a sale (i.e., desired information 160), and transmits the sale information (i.e., the desired information 160) to the user 108 driving on the highway. The user 108 is driving in the vicinity of the jewelry store (i.e., the client 130). The user 108 has previously registered to receive the desired information 160 (i.e., the jewelry store sale information) via a wireless device 116, such as a cell phone.

Figure 3:
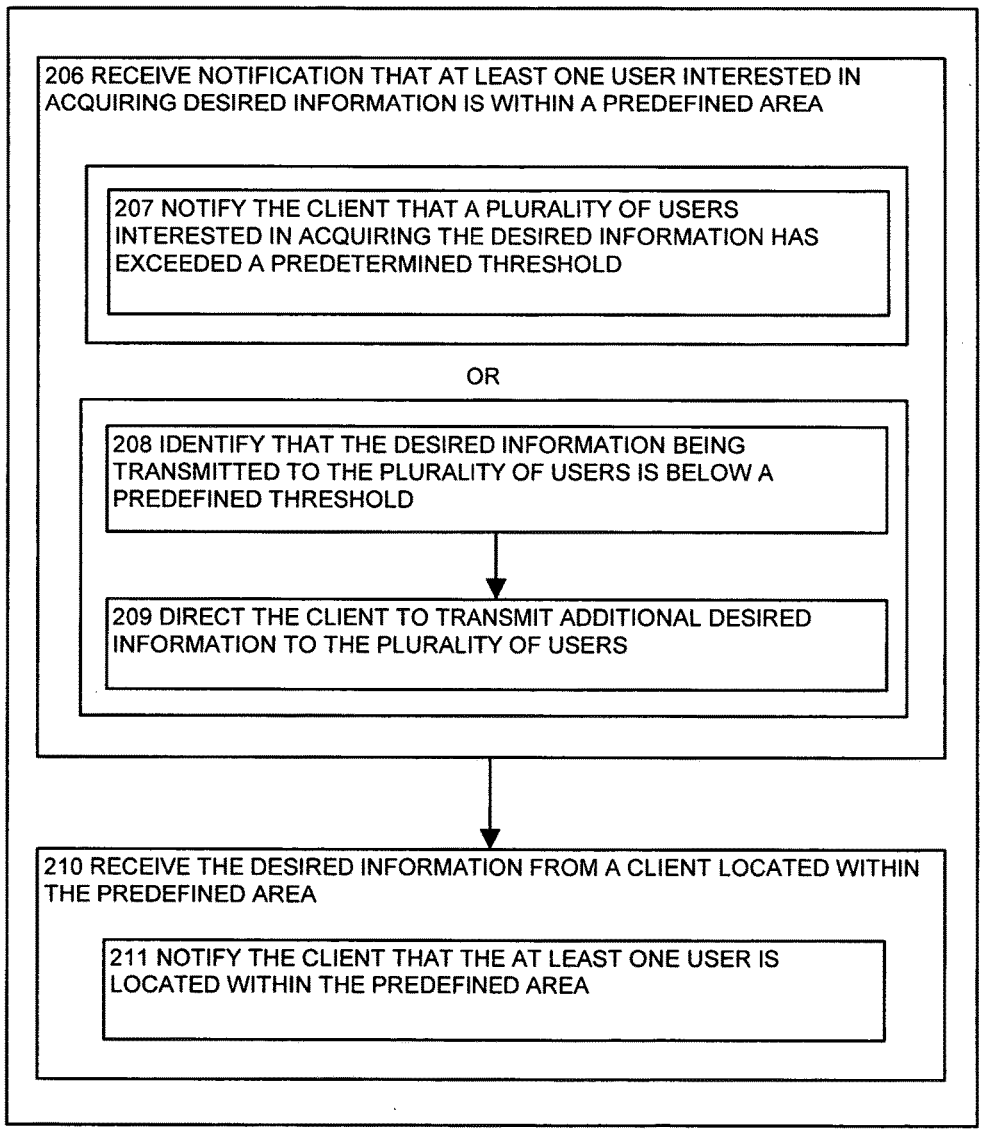
FIG. 3 illustrates a flowchart of an embodiment of a procedure performed by the system of FIG. 1 when the user targeting process receives notification that at least one user, interested in acquiring desired information, is within a predefined area, and notifies a client of this information.

FIG. 3 is an embodiment of the steps performed by the user targeting process 140-2 when it receives notification that at least one user 108 interested in acquiring desired information 160 is within a predefined area, and notifies the client 130 that a plurality of users 108 is within the predefined area.

In step 206, the user targeting process 140-2 receives notification that at least one user 108 interested in acquiring desired information 108 is within a predefined area. In an example configuration, a user 108 is sitting in a stadium, watching a baseball game. The user targeting process 140-2 receives notification, via Global Positioning Satellite technology, that the user 108 is located in the stadium. The user 108, sitting in the stadium, has registered with the user targeting process 140-2, and chosen to receive desired information 160 regarding a preferred chain restaurant.

In step 207, the user targeting process 140-2 notifies the client that a plurality of users 108 interested in acquiring the desired information 160 has exceeded a predetermined threshold. In an example configuration, the user targeting process 140-2 notifies the chain restaurant (i.e., the client 130) that a very large number of users 108, who have requested desired information 160 from the chain restaurant (i.e., the client 130) are located in the stadium. In this example, the predefined threshold is the number of patrons (i.e., users 108) the chain restaurant (i.e., the client 130) can comfortably seat and serve within a reasonable time period. The user targeting process 140-2 notifies the client 130 (i.e., the chain restaurant) of this large number of users 108 located in the stadium so that the client 130 can take advantage of the fact that so many users 108 are in the vicinity of the client 130. In this example, the user targeting process 140-2 receives, from the client 130 (i.e., the chain restaurant), desired information 160 intended for the users 108 located in the stadium. The desired information 160 contains incentives for the users 108 to visit various franchises of the chain restaurant (i.e., the client 130) located along the route the users 108 will take as they travel home, when the users 108 leave the stadium. In this example, the client 130 (i.e., the chain restaurant) does not lose these users 108 to other restaurants in the area, and also doesn't overwhelm the franchise of the chain restaurant (i.e., the client 130) located nearest to the stadium. The users 108 are happy to receive an incentive, such as a discount on their meal, and are also happy to enter a franchise of the chain restaurant (i.e., the client 130), closer to the users' 108 home, that can seat and serve the users 108 promptly.

Alternatively, in step 208, the user targeting process 140-2 identifies that the desired information 160 being transmitted to the plurality of users 108 is below a predefined threshold. In an example configuration, the user targeting process 140-2 identifies a low volume of desired information 160 'traffic' is being transmitted to users 108.

In step 209, the user targeting process 140-2 directs the client 130 to transmit additional desired information 160 to the plurality of users 108. In an example configuration, the user targeting process 140-2 identifies a large number of users 108 in the vicinity of the client 130, and also identifies that a low volume of desired information 160 is being transmitted (from a plurality of clients 130) to the identified users 108. The user targeting process 140-2 notifies the clients 130 of this low volume to encourage the clients 130 to take advantage of the low volume advertisement (i.e., desired information 160) traffic and send out advertisements (i.e., desired information 160) to these users 108. Thus, the clients 130 are more likely to have a captive audience of users 108 receiving the advertisements (i.e., desired information 160).

In step 210, the user targeting process 140-2 receives the desired information 160 from a client 130 located within the predefined area. In an example configuration, the client 130 is a jewelry store, holding a sale, and wishes to notify interested customers (i.e., users 108) of the ongoing sale (i.e., the desired information 160). The user targeting process 140-2 receives notification from the jewelry store (i.e., the client 130) of the jewelry store's sale (i.e., the desired information 160).

In step 211, the user targeting process 140-2 notifies the client 130 that the at least one user 108 is in the located within the predefined area. In an example configuration, the client 130 is notified of the proximity of the user 108 to the location of the client 130, thus allowing the client 130 to tailor the desired information 160 to the wishes of the user 108. Previously, the user 108 provided a policy to be notified of desired information 160 regarding jewelry stores in the user's 108 neighborhood, during the two week period prior to the user's 108 anniversary. In this example, the client 130 can tailor the desired information 160 per the user's 108 wishes. Thus, the user targeting process 140-2 notifies the jewelry store (i.e., the client 130) that the user 108 who wishes to be notified of jewelry sales two weeks prior to the user's 108 anniversary, is in the vicinity of the jewelry store (i.e., the client 130). The user targeting process 140-2 then receives the jewelry sale information and an anniversary reminder (i.e., the desired information 160) from the jewelry store (i.e., the client 130), and transmits that desired information 160 to the user 108. The user 108, driving on the highway, receives a text message on the user's 108 wireless device 116 (i.e., a cell phone), that the jewelry store is nearby, having a sale, and that the users' 108 anniversary is two weeks away.

Figure 4:
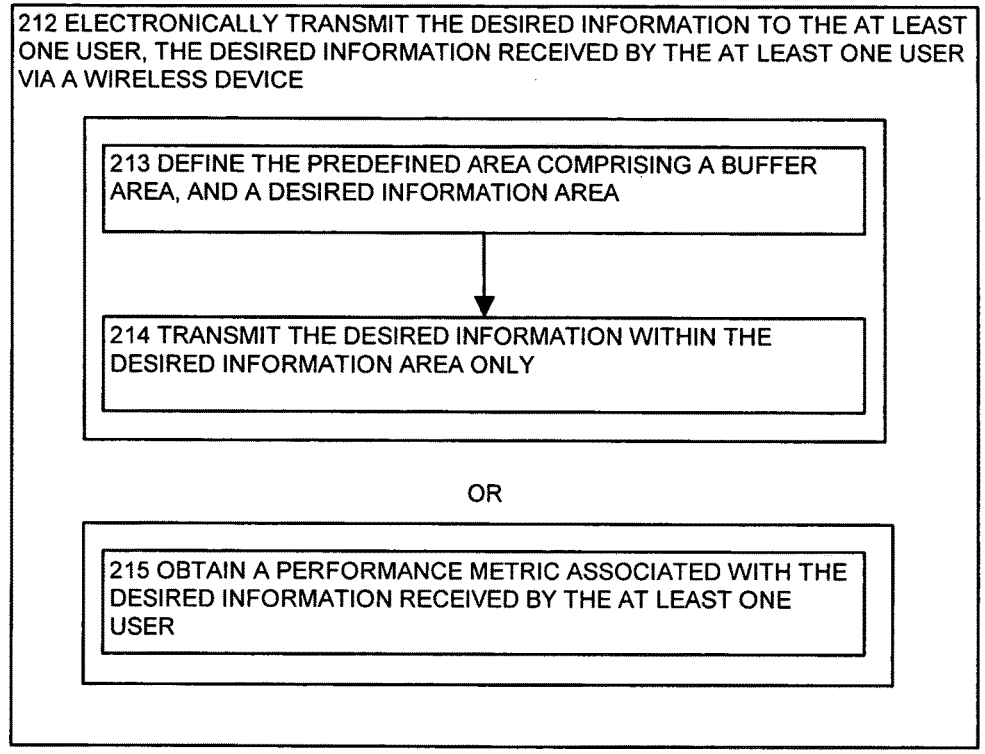
FIG. 4 illustrates a flowchart of an embodiment of a procedure performed by the system of FIG. 1 when the user targeting process electronically transmits the desired information to the at least one user, the desired information received by the at least one user via a wireless device

FIG. 4 is an embodiment of the steps performed by the user targeting process 140-2 when it electronically transmits the desired information 160 to the user 108. The user 108, via a wireless device 116, receives the desired information 160. A client 130 can specify a buffer area within the predefined area in which users 108 are not to receive desired information 160.

In step 212, the user targeting process 140-2 electronically transmits the desired information 160 to the at least one user 108. The desired information 160 is received by at least one user 108 via a wireless device 116, such as a cell phone, etc. In an example configuration, the user targeting process 140-2 receives notification from a restaurant (i.e., the client 130) that the restaurant is offering a discount (i.e., desired information 160), and transmits the discount information (i.e., the desired information 160) to the user 108 driving on the highway. The user 108 is driving in the vicinity of the restaurant (i.e., the client 130). The user 108 has previously registered to receive the desired information 160 (i.e., the restaurant discount information) via a wireless device 116, such as a cell phone.

In step 213, the user targeting process 140-2 defines the predefined area comprising a buffer area, and a desired information area. In an example configuration, the user targeting process 140-2 receives notification from a restaurant (i.e., the client 130) that the restaurant is offering a discount (i.e., desired information 160) to users within a predefined area. In this example, the predefined area comprises a buffer area (defined as the restaurant and the restaurant parking lot), and a desired information area (defined as a 20 miles radius from the restaurant).

In step 214, the user targeting process 140-2 transmits the desired information 160 within the desired information area only. In an example configuration, the restaurant (i.e., the client 130) has determined that the discount offered by the restaurant, should only apply to those users 108 not located in the restaurant or the restaurant parking lot. The rational behind this policy is that the discount is offered as an incentive for users 108, who otherwise would go elsewhere, to patronize the restaurant (i.e., the client 130). Those users 108 already located within the restaurant or the restaurant's parking lot have already made the decision to patronize that restaurant (i.e., the client 130), and no further incentive is needed to obtain these users 108 as customers of the restaurant (i.e., the client 130). Thus, the user targeting process 140-2 transmits the restaurant discount (i.e., the desired information 160) to those users 108 within the predefined area, who are not located either in the restaurant or in the restaurant's parking lot.

In step 215, the user targeting process 140-2 obtains a performance metric associated with the desired information 160 received by the at least one user 108. The performance metric could include, for example, information detailing how many users 108 viewed the desired information 160 via the wireless device 116. In an example configuration, during the transmitting of the desired information 160 to the user 108, the user targeting process 140-2 also transmits a special 'coupon code' that the user 108 gives to the client 130 when the user 108 utilizes the desired information 160. For example, the user 108 may receive additional desired information 160 (i.e., an additional discount, etc). If the user 108 utilizes the coupon code, the client 130 has a method of determining the extent to which the user targeting process was effective in increasing sales for the client 130.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

The invention claimed is:

1. A method comprising:
receiving global positioning system (GPS) data from each user device of a set of user devices, the GPS data being received by one or more computing devices;
detecting, for each user device of the set of user devices and using the GPS data, a current location of the user device;
determining, for each user device of the set of user devices, that the user device is registered to receive communications from a system;
identifying a subset of the set of user devices, each user device in the subset being determined to be physically located within a predefined area;
determining, based on one or more current locations detected for the subset of the set of user devices, a number of registered user devices that are physically located within a predefined area;
determining that the number of registered user devices exceeds a first predefined user threshold;
monitoring information traffic being transmitted to the subset of the set of user devices, the information traffic being transmitted by one or more clients associated with the predefined area;
generating a traffic-volume variable based on the monitored information traffic;
determining that the traffic-volume variable is below a predefined traffic threshold;
transmitting, to a first client of the one or more clients associated with the predefined area, a notification indicating that the first predefined user threshold has been exceeded and that the traffic-volume variable is below the predefined traffic threshold;
receiving a communication, sent from the first client responsive to the notification, at the one or more computing devices; and
transmitting, in response to the received communication, the communication from the one or more computing devices to each user device of the subset of the set of user devices.

2. The method of claim 1, further comprising:
determining, by the one or more computing devices, that the number of registered user devices that are physically located within the predefined area exceeds a second predefined user threshold, wherein the second predefined user threshold is higher than the first predefined user threshold; and
notifying the first client that the second predefined user threshold has been exceeded.

3. The method of claim 1, wherein transmitting the communication further comprises:
defining a first segment of the predefined area as a buffer area;
defining a second segment of the predefined area as a communication area; and
wherein, for each user device in the subset of the set of user devices, the current location determined for the user device is within the communication area and not the buffer area.

4. The method of claim 1, wherein:
the subset of the set of user devices includes a plurality of user devices.

5. A computing device comprising:
a processor;
a non-transitory computer-readable storage medium containing instructions, which when executed on the processor, cause the processor to perform operations including:
receiving global positioning system (GPS) data from each user device of a set of user devices, the GPS data being received by one or more computing devices;
detecting, for each user device of a set of user devices, a current location of the user device;
determining, for each user device of the set of user devices, that the user device is registered to receive communications from a system;
identifying a subset of the set of user devices, each user device in the subset being determined to be physically located within a predefined area;
determining, based on one or more current locations detected for the subset of the set of user devices, a number of registered user devices that are physically located within a predefined area;
determining that the number of registered user devices exceeds a first predefined user threshold;
monitoring information traffic being transmitted to the subset of the set of user devices, the information traffic being transmitted by one or more clients associated with the predefined area;
generating a traffic-volume variable based on the monitored information traffic;
determining that the traffic-volume variable is below a predefined traffic threshold;
transmitting, to a first client of the one or more clients associated with the predefined area, a notification indicating that the first predefined user threshold has been exceeded and that the traffic-volume variable is below the predefined traffic threshold;

receiving, from the first client in response the notification, a communication; and transmitting, in response to the received communication, the communication to each user device of the subset of the set of user devices.

6. The computing device of claim 5, wherein the operations further include:

determining, that the number of registered user devices that are physically located within the predefined area exceeds a second predefined user threshold, wherein the second predefined user threshold is higher than the first predefined user threshold; and notifying the first client that the second predefined user threshold has been exceeded.

7. The computing device of claim 5, wherein:

the subset of the set of user devices includes a plurality of user devices.

8. The computing device of claim 5, wherein the operations further include:

defining a first segment of the predefined area as a buffer area; and defining a second segment of the predefined area as a communication area;

wherein, for each user device in the subset of the set of user devices, the current location determined for the user device is within the communication area and not the buffer area.

9. A non-transitory computer-readable medium containing instructions, which when executed on a processor, causes the processor to perform operations including:

receiving global positioning system (GPS) data from each user device of a set of user devices, the GPS data being received by a computing device;

detecting, for each user device of a set of user devices, a current location of the user device;

determining, for each user device of the set of user devices, that the user device is registered to receive communications from a system;

identifying a subset of the set of user devices, each user device in the subset being determined to be physically located within a predefined area;

determining, based on one or more current locations detected for the subset of the set of user devices, a number of registered user devices that are physically located within a predefined area;

determining that the number of registered user devices exceeds a first predefined user threshold;

monitoring information traffic being transmitted to the subset of the set of user devices, the information traffic being transmitted by one or more clients associated with the predefined area;

generating a traffic-volume variable based on the monitored information traffic;

determining that the traffic-volume variable is below a predefined traffic threshold;

transmitting, to a first client of the one or more clients associated with the predefined area, a notification indicating that the first predefined user threshold has been exceeded and that the traffic-volume variable is below the predefined traffic threshold;

receiving a communication from the first client in response to the notification,; and transmitting, in response to the received communication, the communication to each user device of the subset of the set of user devices.

10. The non-transitory computer-readable medium of claim 9, further comprising:

determining, by the one or more computing devices, that the number of registered user devices that are physically located within the predefined area exceeds a second predefined user threshold, wherein the second predefined user threshold is higher than the first predefined user threshold; and notifying the first client that the second predefined user threshold has been exceeded.

11. The non-transitory computer-readable medium of claim 9, wherein the operations further include:

defining a first segment of the predefined area as a buffer area; and defining a second segment of the predefined area as a communication area;

wherein, for each user device in the subset of the set of user devices, the current location determined for the user device is within the communication area and not the buffer area.

12. The non-transitory computer-readable medium of claim 9, wherein:

the subset of the set of user devices includes a plurality of user devices.

* * * * *

UNITED STATES PATENT AND TRADEMARK OFFICE
CERTIFICATE OF CORRECTION

| | | |
|---|---|---|
| PATENT NO. | : 10,074,107 B2 | Page 1 of 1 |
| APPLICATION NO. | : 11/331930 | |
| DATED | : September 11, 2018 | |
| INVENTOR(S) | : Grucci et al. | |

It is certified that error appears in the above-identified patent and that said Letters Patent is hereby corrected as shown below:

In the Specification

In Column 4, Line 5, delete "device" and insert -- device. --, therefor.

In the Claims

In Column 12, Line 18, in Claim 9, delete "notification,;" and insert -- notification; --, therefor.

Signed and Sealed this
Sixteenth Day of July, 2019

Andrei Iancu
*Director of the United States Patent and Trademark Office*